United States Patent [19]

Pietersen

[11] 4,230,808

[45] Oct. 28, 1980

[54] METHOD FOR MAKING SOLID MATERIALS HAVING A FLASH POINT OF LESS THAN 500° C. FIRE ALARMING, FIRE ALARMING AND SELF EXTINGUISHING, OR FIRE ALARMING, SELF-EXTINGUISHING AND FIRE ABATING

[76] Inventor: Anthonius H. Pietersen, Thoiry Fenière, St. Genis Pouilly, France

[21] Appl. No.: 964,693

[22] Filed: Nov. 29, 1978

[30] Foreign Application Priority Data

Dec. 1, 1977 [NL] Netherlands .......................... 7713309
Sep. 12, 1978 [NL] Netherlands .......................... 7809289

[51] Int. Cl.$^3$ ............................................... C08G 8/00
[52] U.S. Cl. ...................................... 428/307; 521/59; 521/57; 521/54; 521/55; 264/45.1; 264/45.3; 264/45.9; 428/407; 252/8; 252/408; 116/23; 116/101
[58] Field of Search ..................... 264/45.1, 45.3, 45.9, 264/48; 428/425, 913, 921; 521/57, 59

[56] References Cited

U.S. PATENT DOCUMENTS

| | | | |
|---|---|---|---|
| 4,024,092 | 5/1977 | Sonnenberg | 521/57 |
| 4,026,829 | 5/1977 | Samura et al. | 521/59 |
| 4,035,315 | 7/1977 | Ingram | 521/57 |
| 4,122,203 | 10/1978 | Stahl | 428/921 |

FOREIGN PATENT DOCUMENTS 146181  11/1975  Netherlands .

*Primary Examiner*—Maurice J. Welsh
*Attorney, Agent, or Firm*—Brumbaugh, Graves, Donohue & Raymond

[57] ABSTRACT

Solid materials having a flash point of less than 500° C. are rendered fire alarming by providing for the presence thereon of micro capsules containing a bromofluoroalkane having a critical temperature of at least 100° C., the micro capsules having an external diameter of from 200 to 260 microns, and the wall of the capsules consisting of a polymer, treated to release the bromofluoralkane suddenly at a predetermined temperature to provide a detonation having a maximum sound level of 10–12 kHz.

22 Claims, 3 Drawing Figures

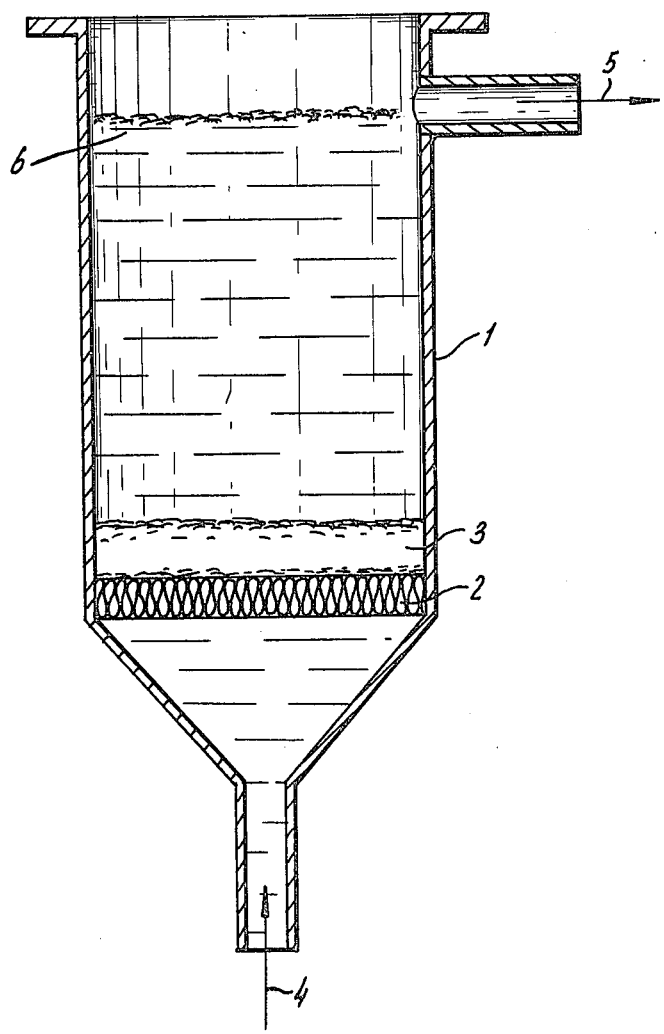

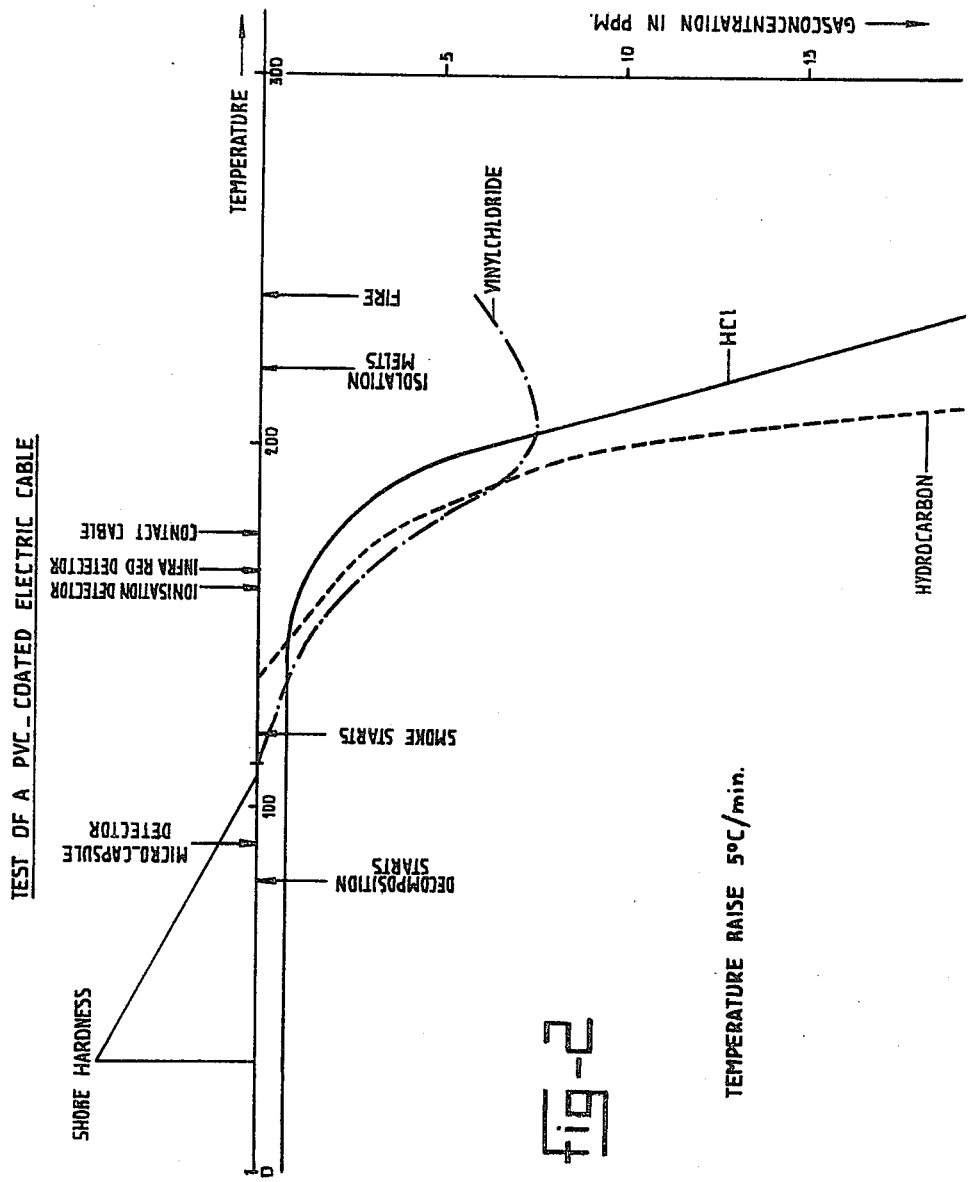

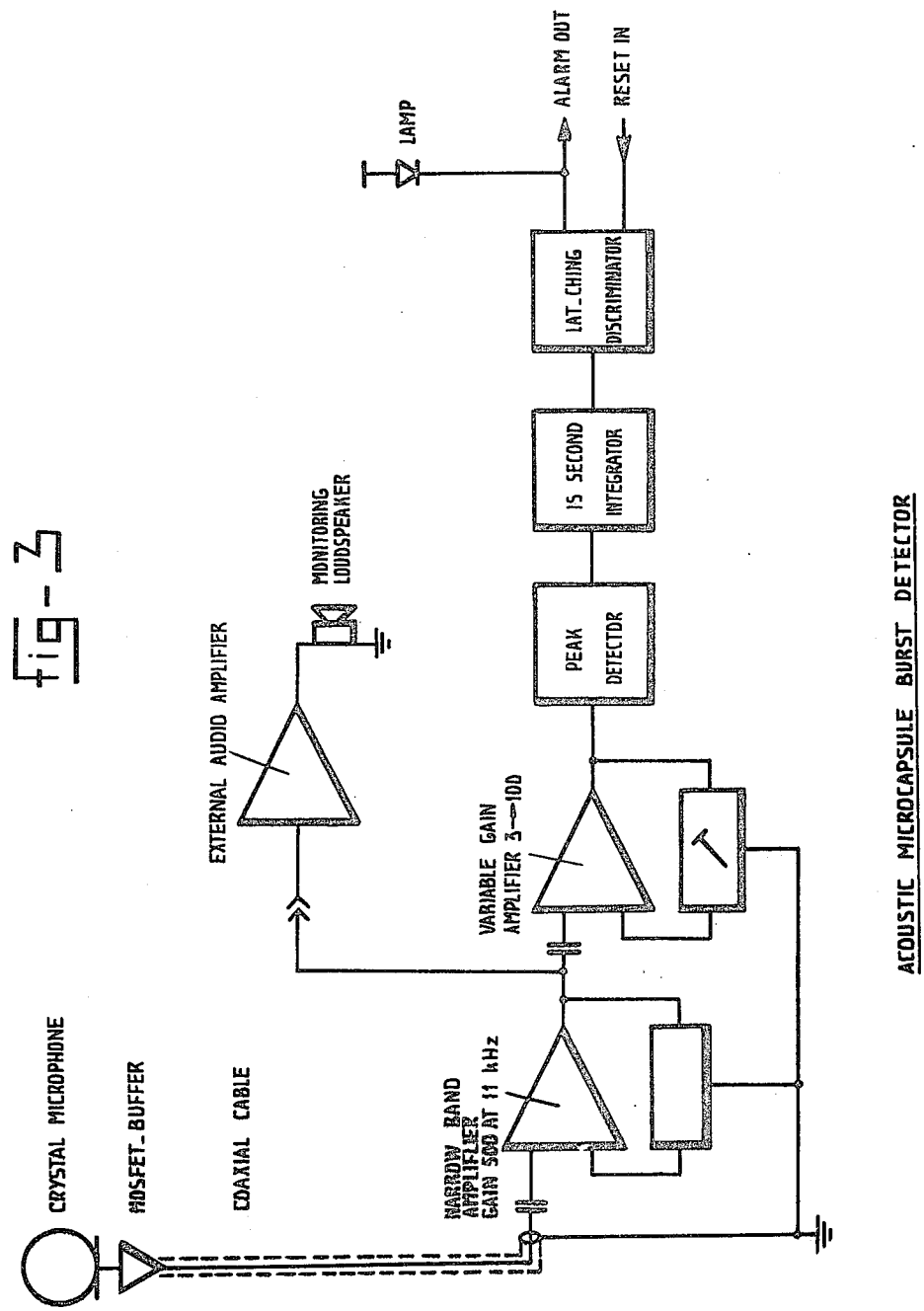

METHOD FOR MAKING SOLID MATERIALS HAVING A FLASH POINT OF LESS THAN 500° C. FIRE ALARMING, FIRE ALARMING AND SELF EXTINGUISHING, OR FIRE ALARMING, SELF-EXTINGUISHING AND FIRE ABATING

The invention relates to a method for making foamed polymeric materials which are solid materials having a flash point of less than 500° C., fire alarming or respectively fire alarming and self extinguishing, respectively fire alarming, self extinguishing and fire abating.

The invention relates particularly to making fire alarming, or fire alarming and self extinguishing or fire alarming, self extinguishing and fire abating, by foaming a homogeneous mixture of the starting materials, comprising blowing agents, and micro capsules containing a bromo fluoro alkane, according to methods known per se.

In Dutch patent specification No. 146.181 a method is disclosed, at which a heat insulating, fire retardant and fire suppressant, rigid polyurethane foam is prepared by reacting a polycyclic aromatic polyisocyanate with a polyether polyol, in the presence of a blowing agent, and a fire retardant and fire suppressant material. The fire retardant and fire suppressive material consists of a mixture of a halogenated polymer, that, at heating at a temperature of from 100° till 300° C., may split off hydrogen halide, and an inorganic salt that at decomposition at higher temperatures splits off a gas. Micro capsules containing a bromo fluoro alkane may also be used. Though the achieved fire retarding and fire suppressing action of such a material is satisfying, it has appeared that said material has an insufficient fire preventive action and in case of a fire it has no particular fire alarming action. Other disadvantages of said material are (a) the release of poisonous and very corrosive materials, such as hydrogen halide, vinyl chloride, chlorine and fluorine at heating within the range of 100° and 300° C.; and (b) a relatively large portion of micro capsules containing bromofluoroalkane is required to achieve a sufficient action of said bromofluoroalkane.

It was found now that a material may be prepared having fire alarming, or fire alarming and self extinguishing, or fire alarming, self extinguishing and fire abating characteristics by incorporating therein micro capsules, having an external diameter of from 200 to 260 microns, the wall of which capsules consists of a polymer the pores of which have been sealed by means of a hydrophobic polycondensation product obtained from an aromatic polyhydroxycompound and an aldehyde and the contents of which consists of bromofluoro alkane, preferably $C_2F_4Br_2$, (1,2-dibromo 1,1,2,2-tetrafluoro ethane) being liquid at room temperature and having a critical temperature of at least 100° C.

For early fire alarming action it is required that said bromo fluoroalkane is released at a predetermined temperature. Wall thickness, inner diameter of the micro capsules and tensile strength of the capsule wall material used, are very important in this respect. The relation of said three properties and the internal pressure at a given temperature is indicated by the formula $$Ri = [e(2 z - 0,6 P)]/P$$

wherein e is the wall thickness in micrometer
P is the internal pressure in atm.
Ri is the internal radius in micrometer
z is the tensile strength of the capsule wall material in $kg/mm^2$.

The micro capsules to be used in the process according to the invention may be prepared according to the process of Dutch patent 151.910. The micro capsules prepared according to said process are selected with respect to their size and diameter. This step of the process can be performed by sieving. For example, micro capsules having an external diameter within the range of from 200 to 260 microns are useful according to this invention. Preferably, the micro capsules have an external diameter of from 210 to 240 microns. Then said selected micro capsules are spread as very thin layers (preferably mono-micro capsulary) and heated at a temperature that is 10° or more centrigrade below the highest temperature that will be used at the use of said micro capsules. Said heating step takes at least 15, but preferably 30 minutes, and the heating is preferably performed by means of a hot gas.

It is very important to perform said heating step carefully to be sure that substantially all micro capsules have been subjected to the above treatment. Subsequently the burst capsules should be removed by using the difference in specific gravity of filled capsules and empty capsules. Empty capsules have a specific gravity of about 0.9 and filled capsules have a specific gravity of about 1.6. In order to perform said separation, said capsules are introduced into a device as shown in attached FIG. 1. Referring to said FIG. 1, a funnel-shaped vessel (1) is shown, provided with a glass filter (2), a liquid supply tube (4), and an overflow (5).

The micro capsules, after undergoing the heating step described above, are poured onto the glass filter (2), as indicated at (3), and water of 20° C. is slowly introduced through liquid supply tube (4). The filled capsules remain floating substantially on and near the upper side of said glass filter, whereas empty capsules rise to the top of vessel (1), as shown at (6), and are removed via overflow (5).

If micro capsules would be used falling outside of the range of from 200 to 260 micrometer for example as used according to Dutch patent No. 146 181, the decomposition temperature of the material would be reached within a too long period and within a too large temperature range, so that the micro capsules provide a too much spread and consequently insufficient contribution as fire alarmer. In that case the temperature increase would have been alarmed already by other alarm devices that are sensitive for smoke, gases, light etc., whereas it is just very important that the increase of temperature is alarmed before the protected articles have been damaged irrepairably and smoke, gases and light have been caused by a temperature increase.

In a preferred embodiment of the present method the micro capsules are incorporated in a foam having a flash point of less than 400° C.

The micro capsules that are used according to the process of Dutch patent specification No. 146.181 and which contain a bromofluoro alkane, possess too large a variation in external diameters and at higher temperatures have relatively flexible, weakened walls, so that the micro capsules are opened at an increase of temperature but do not burst suddenly at a temperature increase.

In order to obtain alarming of undesired and inadmissable temperature increases it is desired that the release of the bromofluoro alkane from said micro capsules occurs suddenly and explosively. Micro capsules that burst open in said way, cause a detonation that has very particular acoustical properties, i.e. a maximum sound level of from 10-12 KHz. Particularly at the above mentioned narrow range of diameters of the capsules the capsules detonate at very short intervals (milli seconds).

In case a material should be treated just for fire alarming, the quantity of micro capsules required amounts at least 1 g/m$^2$ of treated surface. The maximum quantity of micro capsules to be used in this case, is determined by economical considerations and the properties of the material to be protected. However, generally it is not required to use more than 50 g/m$^2$ protected surface. Already at explosion of 150 micro capsules per square meter an alarm, indicating that an abnormal increase of temperature takes place, occurs. Said number of micro capsules per square meter corresponds to a contents of 1 cubic mm.

In case the micro capsules are used just for alarming purposes, they may be incorporated in a carrier (for example a foam material) as well as applied on a carrier (for example a buttstrape or ribbon from a plastic material).

In case the micro capsules are used for making materials fire alarming and self extinguishing, at least 10 weight percent, calculated on the starting materials, of micro capsules have to be incorporated in the material to be protected. In this case too, the upper limit of the quantity of micro capsules to be used is determined by economical considerations and the properties of the material to be protected. Polyurethane foams have been prepared wherein 100 weight percent, that means 50 parts by weight of micro capsules per 50 parts by weight of starting material, of micro capsules were used. Even in this case the quality of the foam was quite acceptable.

In case the micro capsules are used in combination with encapsulated or free urea in a weight ratio of bromofluoro alkane containing micro capsules to urea of 2:98 to 99.5:0.5, the quantity of micro capsules can be reduced. For example in case of a weight ratio of bromofluoroalkane containing micro capsules to urea of 33:67, just 10 weight percent of said blend, thus 3.33 weight percent of micro capsules are required to achieve the same effect as the effect obtained in absence of urea by using 10 weight percent of micro capsules. This is particularly in economical respect very important since urea is much cheaper than bromofluoroalkanes. However, it is not possible to use urea only to achieve a good self extinguishing polyurethane foam. In case 10 weight percent urea, calculated on the starting materials, is used in a polyurethane foam the fire extinguishing action is extremely poor and the structure of the polyurethane foam prepared is very poor likewise. This is the more surprising since in case a blend from micro capsules and urea is used, a foam material having an increased homogeneity and smaller cells is obtained. Said change in structure improves the elasticity and tensile strength of the foam prepared.

In case the micro capsules are used for making materials fire alarming, self extinguishing and fire abating, at least 30 weight percent, calculated on the starting materials, should be incorporated in the material to be protected. In this case too, the upper limit of the quantity of micro capsules to be used is determined by economical considerations and the properties of the material to be protected. Evidently the micro capsules may be used also without a carrier or may be suspended in a liquid foam, for example for extinguishing fires. This provides the possibility to use micro capsules in fire extinguishers and foam extinguishers.

The fire extinguishing and fire abating action of bromofluoro alkane is due to the fact that at high temperatures bromofluoro alkanes provide bromine ions. Said bromine ions react with hydrogen atoms being present in fuels and form HBr, which in turn reacts with reactive hydroxyl radicals and forms water and other bromine ions, which in turn may react again with hydrogen atoms of a fuel and so on.

According to the ionic theory elemental oxygen must be activated by absorbing free electrons before it can react with a fuel. The bromine atom of a halon provides a much larger target for this capture of electrons than does oxygen and thus reduces the probability of oxygen activation.

Both theories brake the chain reaction of a fire with relatively small quantities of extinguishing agents; for plastics, this quantity is approximately 5 percent by volume of halogen.

Due to the very active action of the halons used according to the present invention just a quantity of one tenth of the traditional extinguishing agent carbon dioxide is required.

With regard to the toxicity of the fire extinguishing materials used according to the present invention, it seems useful to mention that tests run at the University of Wisconsin have allowed to exclude cardiotoxic effects of three Halons, viz. 1301, 1211 and 2402, at the dosage discharged. Halon 1211 is a halogenated fire extinguishant bromochlorodifluoromethane marketed by ICI America Inc. Halon 2402, ($C_2F_4Br_2$), is 1,2-dibromo 1,1,2,2-tetrafluoro ethane. In consideration of the fact that 500 ppm v/v is the maximum allowed concentration for intense exposure (short term), this is to be regarded as safe also from this point of view. On the other hand, with a concentration of 500 ppm v/v tests have shown biological inactivity for exposures for 4 hours (dose factor 12). Hence the value of 500 ppm v/v should be regarded as a possible maximum TLV (threshold limit value), which therefore should range from 200 to 500 ppm v/v.

It is important to observe that statistically it has been determined that in about 30% of all fires a small electric defect causes said fire. Such fires may be developed within a long period before they are observed.

The development of heat may be very locally, for example by poor connections, or in an extensive area, for example if a conductor is overheated.

Fires originate often at spots where for different reasons a regular control and service is substantially impossible or where during the use of a device poor or movable electric contacts may come about. The installation of fire seals may contribute or prevent extension of a fire, but an early alarm is essential to avoid serious fire damages. Thus efficient alarm systems are required.

There are four stages of a fire:
1. the incipient stage, which often extends over a long period, whereas there are neither visible smoke nor flames, and significant amounts of heat are not generated. However, gases or vapours may be released, and some combustion products may be produced in the form of aerosols. Said combustion products are difficult to detect; some times they can be detected just by their smell.

2. the smouldering stage, wherein the fire develops; the quantity of combustion products increases to the point where they become visible as a smoke. The odour of burning increases, but there are still no flames and the emanation of heat remains insignificant.

3. the flame stage, wherein the fire develops further and ignition occurs. Infrared energy is now given off by the flames, whereas the production of visible smoke usually decreases and more heat is generated.

4. the heat stage, wherein large amounts of heat, flames, smoke and toxicant inflammable gases are produced. Transition from the third to the fourth stage usually occurs very quickly.

The fire retarding and fire suppressing material prepared according to the invention provides an alarm in the event of a fire in the incipient stage. The alarm systems used up to now start to alarm when the smouldering stage has started.

According to the invention, solid materials having a flash point of less than 500° C. may be made fire alarming, or fire alarming and self extinguishing, or fire alarming self extinguishing and fire abating, by applying thereto a coating composition for example a paint, a lacquer, a putty, a sealing or a cover, wherein the above micro capsules, if desired in combination with urea, have been incorporated. Further, said solid materials have been made fire alarming, fire alarming and self extinguishing, fire alarming, self extinguishing and fire abating, by incorporating said micro capsules in materials having a cellular or solid structure, if desired likewise in combination with urea.

The process of the invention is not only proper to make some well defined spaces fire retardant and fire suppressing, but may be used also to envelope or to insulate different materials, such as electric cables. In that case, a layer of micro capsules, selected in regard to specific gravity, filled with a bromofluoroalkane (critical temperature over 100° C.), is applied on the profiled insulating material that has been applied by means of extrusion, in such a way that they are prevented from damage and which micro capsules are adhered to said insulating material by means of a binder.

The attached drawing FIG. 2 illustrates clearly the advantages of a cable insulation containing micro capsules of the invention.

Referring to FIG. 2, the graph thereon shows the results of testing a PVC-coated electric cable by subjecting it to steadily increasing temperatures, which increase at the rate of 5° C. per minute. When the temperature exceeds 100° C., vinylchloride begins to be released to the atmosphere. Smoke starts being released at about 120° C. At about 135° C., hydrocarbons commence to be released. Continuing the heating, the insulation melts at approximately 215° C. and fire occurs at about 230°-235° C.

FIG. 2 also shows at what point in the temperature curve various alarm systems become effective. The contact cable method is effective at about 175° C. while ionization detectors and infrared detectors will alarm at about 160°-165° C. The micro capsule detector of the present invention on the other hand alarms at a temperature below 100° C.

In accordance with one embodiment, a mixture of thermoplastic material and urea may be extruded at an increased temperature and under an increased pressure to obtain a film. While the film is still warm and sticky, one or both sides of said film may be powdered with micro capsules containing bromofluoroalkane. Upon cooling the film further, the micro capsules adhere to the film and a suitable material for use according to this invention is obtained.

Particular applications of the materials according to the invention are the repression of oil and gas fires at land and on sea, as well as the repression of wood and moor fires, by throwing micro capsules containing carriers upon and around the fire seat.

EXAMPLE 1

(Fire alarming)

In a store of 100×25×9 meter an electric cable having a length of 25 m, a conductor diameter of 4 square mm and an external diameter of the insulation of 11 mm was installed. Said conductor was connected with a generator. On the outer surface of said cable 3 g of micro capsules, containing liquid Halon 2402, and resistant against temperatures of up to 100° C., were applied.

At a distance of 20 m an acoustic detector of the type shown in FIG. 3 was istalled.

At a distance of 9 m above said cable a suction device, consisting of a perforated tube having a length of 25 m and an internal diameter of 25 mm, connected with a suction fan an a Halon gas detector was installed. When the above cable was heated by means of said generator to a temperature exceeding 100° C., it was observed that 90 seconds after explosion of the microcapsules the acoustic detector alarmed and that 130 seconds after explosion of the micro capsules said gas detector alarmed.

EXAMPLE 2

(Fire alarming)

In a subway tunnel in Brussels a cable as used in example 1 was applied at 2½ m above the surface and at a distance of 3.5 m from the rails, on which each 3 minutes a train passed. 0.5 g of micro capsules (containing liquid Halon 2402) resistant against a temperature of up to 100° C., was applied on said cable by means of double scotch adhesive tape. An acoustic detector was installed at a distance of 10 m. Sound measurements performed when trains passed recorded sound frequencies from 100 Hz to 25 KHz and sound levels of 35 to 115 decibels. At an outer surface temperature of the insulation of 100° C. the micro capsules applied bursted. Said explosions were recorded acoustically 30 seconds after said explosion had occured. Said recording was transferred into an alarm.

It is useful to mention that that different noise levels mentioned did not cause false alarms.

EXAMPLE 3

(Fire alarming and self extinguishing)

In the store of example 1, the cable used there was replaced by a plate of 90×40×2.5 cm of a polyurethane foam that contained 40 weight percent micro capsules of the type used in example 1. Said polyurethane foam plate was mounted horizontally at a distance of 2 m above the surface. On the surface below said plate a wood fire was made from 1 kg splintered wood. The acoustical detector mentioned in example 1 recorded a fire alarm 70 seconds after the beginning of said fire.

After extinguishing the fire it appeared that the above polyurethane plate neither had been burned, discoloured, nor twisted.

EXAMPLE 4

(Fire alarming and self extinguishing)

A flexible foam was prepared from
100 parts by weight polyol (4100 S of Dow Chemical)
47 parts by weight 80/20 toluylene diisocyanate (Dow Chemicals)
4.0 parts by weight water
0.35 parts by weight dimethyl ethanol amine,
0.55 part by weight siloxane DC196 (Dow Chemical)
0.24 part by weight tin octoate and the various amounts of micro capsules of
10,15,20 and 40 weight percent, respectively calculated on the above 151 parts by weight of starting material the, micro capsules having a diameter of 260 mm and being filled with Halon 2402 ($C_2F_4Br_2$).

The physical properties of said foam did not differ from the physical properties of a foam prepared without micro capsules.

Samples were subjected to the MVSS 302 test, at which the char length was 1.75 respectively 1.50 respectively 1.12 respectively 1.10 cm.

In the MVSS 302 test a sample of 37.5×2.54×1.25 cm is suspended vertically at the end having a surface of 2.54×1.25 cm. Below said suspended sample a Bunsen burner is located, in such a position that the top of the non-lightning flame touches the lower side of said sample.

10 seconds after the beginning of said test the test material may have been charred over a distance of up to 2.5 cm. The present samples meet said requirement in an ample way. The samples met also in 5-fold the requirements of the California vertical flame-test number 117, that corresponds to DIN 4102 Class B2.

EXAMPLE 5

(Fire alarming and self extinguishing)

In example 4 the polyurethane is replaced by polyethylene. Same results with respect to the self extinguishing properties are achieved.

EXAMPLE 6

(Fire alarming and self extinguishing)

A flexible foam was prepared according to the traditional methods from
100 parts by weight polyol (4100 S of Dow Chemical)
47 parts by weight 80/20 toluylene diisocyanate (Dow Chemical)
4 parts by weight water
0.35 part by weight dimethyl ethanol amine
0.55 part by weight siloxane DC 196 (Dow Chemical)
0.24 part by weight tin octoate
3.33 weight percent, calculated on 151 parts by weight of polyol and toluylene diisocyanate plus water, of micro capsules having a diameter of from 200 to 260 micro meter and filled with liquid Halon 2402,
6.67 weight percent, calculated on 151 parts by weight of polyol and toluylene diisocyanate plus water, of urea and
5 weight percent ammonium polyphosphate.

The foam prepared in this way met the requirements of class 94 HEF-1 (UL 94).

The UL 94 test is described in the Underwriters Letter Inc. Standard for tests for flammability of plastic materials dated February 1, 1971, pages 9 to 11.

EXAMPLE 7

(Fire alarming and self extinguishing)

A hard foam was prepared according to the traditional methods from
100 parts by weight polyether alcohol
20 parts by weight tertiary amine
5 parts by weight di-tertiary amine
5 parts by weight water
50 parts by weight methyl diisocyanate
3,33 parts by weight, calculated on polyether alcohol plus diisocyanate plus water, of micro capsules
6.67 parts by weight, calculated on polyether alcohol plus water plus diisocyanate, of urea and
5 parts by weight ammonium polyphosphate.

The foam prepared in this way met the requirements of class 94 HEF-1 (UL 94).

EXAMPLE 8

(Fire alarming and self extinguishing)

In a filter material manufactured according to Dutch patent application No. 76 14376 10 weight percent micro capsules (filled with liquid Halon 2402) were incorporated, by first spreading said micro capsules over said filter material and subsequently subjecting said micro capsules containing filter material to a treatment on a needle-loom.

At the horizontal fire test (DIN 4102) appeared that the charred length of 5 samples was continuously smaller than 10 mm. At the oxygen index measurement, an oxygene index of 31 was determined.

EXAMPLE 9

(Fire alarming and self extinguishing)

A hard foam was prepared according to the traditional methods from
100 parts by weight polyether alcohol
20 parts by weight tertiary amine
5 parts by weight di-tertiary amine
5 parts by weight water
50 parts by weight methyl diisocyanate
3.33 parts by weight, calculated on polyether alcohol plus diisocyanate plus water, of micro capsules
6.67 parts by weight, calculated on polyether alcohol plus water plus diisocyanate, of urea and
3 parts by weight trihydroxy ethyl isocyanurate.

The foam prepared in this way met the requirements of class 94 HEF-1 (UL 94).

I claim:

1. In a method of making solid materials having a flash point of less than 500° C. fire alarming, or fire alarming and self extinguishing, or fire alarming, self extinguishing and fire abating, the improvement comprising applying to said solid material at least one surface layer containing micro capsules of a bromofluoroalkane, the micro capsules having an external diameter of from 200 to 260 micrometers, and further having walls consisting of a polymer having pores therein, the pores having been sealed by means of a hydrophobic polycondensation product of an aromatic polyhydroxy compound and an aldehyde, and the bromofluoroalkane within the micro capsules being liquid at ambient temperature and having a critical temperature of at least 100° C.

2. The method according to claim 1, wherein the surface layer additionally contains urea, and the bromofluoroalkane and urea are present in a weight ratio of 2:98 to 99.5:0.5.

3. The method of claim 2, wherein the bromofluoroalkane and urea are present in a weight ratio of 1:2 to 2:1.

4. The method of claims 1, 2 or 3, wherein the surface layer containing micro capsules is a foamed polymer.

5. The method of claim 4, wherein the foamed polymer has a flash point below 400° C.

6. The method of claims 1–4 or 5, wherein the said surface layer contains at least 1 g of micro capsules per square meter.

7. The method of claims 1–4 or 5, wherein the said surface layer contains at least 10 weight percent, calculated on the starting materials of said micro capsules, whereby it is fire alarming and self extinguishing.

8. The method of claims 1–4 or 5, wherein said surface layer is a fire alarming and self extinguishing material containing 3.33 weight percent of said micro capsules and 6.67 weight percent of urea, both calculated on the weight of the starting materials.

9. The method of claims 1–4 or 5, wherein said surface layer contains at least 30 weight percent, calculated on the starting materials, of said micro capsules to provide a fire alarming, self extinguishing and fire abating material.

10. The method of claims 1–4 or 5, wherein said surface layer contains 10 weight percent of said micro capsules and 20 weight percent of urea, calculated on the weight of the starting materials, to provide a fire alarming, self extinguishing and fire abating material.

11. A process according to claims 1–9 or 10, characterized in that the film forming material of the micro capsules wall consists predominantly of polyvinyl alcohol.

12. A process according to claims 1–10 or 11, characterized in using 1,2-dibromo 1,1,2,2-tetrafluoro ethane as said bromofluoroalkane.

13. A process according to claim 1, characterized in applying on a solid material having a flash point below 500° C. a paint layer that contains micro capsules containing bromofluoroalkane.

14. A process according to claims 1–4 or 5, characterized in applying on an extruded embossed insulating material of an electrical cable a layer of bromofluoroalkane containing micro capsules and urea or urea containing micro capsules in such a way that they are protected against damage.

15. A process according to claims 1–4 or 5, characterized in preparing plates of foamed polyurethane wherein bromofluoroalkane containing micro capsules and urea or urea containing micro capsules have been incorporated.

16. A process according to claims 1–14 or 15, characterized in extruding a mixture of a thermoplastic material and urea at an increased temperature and under an increased pressure to obtain a film, powdering on one side or both sides of said film, when it is still warm and sticky, bromofluoroalkane containing micro capsules and cooling said film further.

17. Micro capsules of bromofluoroalkane having an external diameter of from 200 to 260 micrometers, the walls thereof consisting of a polymer and having pores therein, the pores having been sealed by means of a hydrophobic polycondensation product of an aromatic polyhydroxy compound and an aldehyde, and the bromofluoroalkane being liquid at ambient temperature and having a critical temperature of at least 100° C.

18. The micro capsules of claim 17, wherein the bromofluoroalkane is 1,2-dibromo 1,1,2,2-tetrafluoro ethane.

19. The micro capsules of claim 17, wherein the micro capsules have been subjected to heat at a temperature 10° C. or more below the highest temperature that it will be used at.

20. A solid material having a flash point of less than 500° C. and having at least one surface layer containing a fire alarming amount of the micro capsules of claim 17.

21. The material of claim 20, wherein said surface layer additionally contains urea, and the bromofluoroalkane and urea are present in a weight ratio of 2:98 to 99.5:0.5.

22. The micro capsules of claim 17, wherein the film forming material of the wall of the micro capsules consists predominantly of polyvinyl alcohol.

* * * * *